(12) United States Patent
Trygstad

(10) Patent No.: US 9,783,742 B2
(45) Date of Patent: *Oct. 10, 2017

(54) SYSTEM AND METHOD FOR CONTROLLING AND OPTIMIZING THE HYDROTHERMAL UPGRADING OF HEAVY CRUDE OIL AND BITUMEN

(71) Applicant: W. Marcus Trygstad, Spring, TX (US)

(72) Inventor: W. Marcus Trygstad, Spring, TX (US)

(73) Assignee: Aduro Energy, Inc., North York, Toronto (CA)

( * ) Notice: Subject to any disclaimer, the term of this patent is extended or adjusted under 35 U.S.C. 154(b) by 771 days.

This patent is subject to a terminal disclaimer.

(21) Appl. No.: 14/064,317

(22) Filed: Oct. 28, 2013

(65) Prior Publication Data

US 2014/0238899 A1 Aug. 28, 2014

Related U.S. Application Data

(60) Provisional application No. 61/770,638, filed on Feb. 28, 2013.

(51) Int. Cl.
| | | |
|---|---|---|
| *B01J 19/00* | (2006.01) | |
| *B01J 19/24* | (2006.01) | |
| (Continued) | | |

(52) U.S. Cl.
CPC ............ *C10G 9/20* (2013.01); *B01J 19/0013* (2013.01); *B01J 19/1818* (2013.01);
(Continued)

(58) Field of Classification Search
CPC .. E21B 41/00; C10G 1/00; C10G 1/04; C10G 1/047; C10G 9/00; C10G 9/14;
(Continued)

(56) References Cited

U.S. PATENT DOCUMENTS

| | | |
|---|---|---|
| 1,956,567 A | 5/1934 | Ellis |
| 3,607,130 A | 9/1971 | Worley |
| (Continued) | | |

FOREIGN PATENT DOCUMENTS

| | | |
|---|---|---|
| CA | 277 406 2 | 4/2011 |
| WO | WO 2009 085461 A1 | 7/2009 |

*Primary Examiner* — Natasha Young
(74) *Attorney, Agent, or Firm* — Davis, Malm & D'Agostine, P.C.

(57) ABSTRACT

A system and method is provided for upgrading a continuously flowing process stream including heavy crude oil (HCO). A reactor receives the process stream in combination with water, at an inlet temperature within a range of about 60° C. to about 200° C. The reactor includes one or more process flow tubes having a combined length of about 30 times their aggregated transverse cross-sectional dimension, and progressively heats the process stream to an outlet temperature T(max)1 within a range of between about 260° C. to about 400° C. The reactor maintains the process stream at a pressure sufficient to ensure that it remains a single phase at T(max)1. A controller selectively adjusts the rate of flow of the process stream through the reactor to maintain a total residence time of greater than about 1 minute and less than about 25 minutes.

34 Claims, 12 Drawing Sheets

(51) Int. Cl.
*E21B 41/00* (2006.01)
*C10G 1/00* (2006.01)
*C10G 1/04* (2006.01)
*C10G 9/00* (2006.01)
*C10G 9/14* (2006.01)
*C10G 9/18* (2006.01)
*C10G 9/20* (2006.01)
*C10G 9/36* (2006.01)
*B01J 19/18* (2006.01)

(52) U.S. Cl.
CPC ............... *B01J 2219/0011* (2013.01); *B01J 2219/00081* (2013.01); *B01J 2219/00159* (2013.01); *B01J 2219/00166* (2013.01); *B01J 2219/00243* (2013.01)

(58) Field of Classification Search
CPC ..... C10G 9/18; C10G 9/20; C10G 9/36; B01J 19/00; B01J 19/24; B01J 19/2415; B01J 19/242; B01J 2219/00049–2219/00063; B01J 2219/00074; B01J 2219/00092; B01J 2219/00094; B01J 2219/00105; B01J 2219/0011; B01J 2219/00164; B01J 2219/00166

See application file for complete search history.

(56) References Cited

U.S. PATENT DOCUMENTS

| | | |
|---|---|---|
| 4,265,731 A | 5/1981 | Mitchell |
| 4,719,002 A * | 1/1988 | Mayer .................... C10G 49/12 208/108 |
| 4,778,586 A | 10/1988 | Bain et al. |
| 4,840,725 A | 6/1989 | Paspek |
| 6,048,448 A | 4/2000 | Nirell |
| 7,947,165 B2 | 5/2011 | Berkowitz et al. |
| 8,105,480 B2 | 1/2012 | Chornet et al. |
| 2005/0150817 A1 | 7/2005 | Tallman et al. |
| 2008/0099378 A1 | 5/2008 | He et al. |
| 2008/0274017 A1 | 11/2008 | Boykin et al. |
| 2009/0159498 A1 | 6/2009 | Chinn et al. |
| 2010/0236783 A1 | 9/2010 | Nenniger et al. |
| 2010/0276147 A9 | 11/2010 | Hocking |
| 2013/0105362 A1 | 5/2013 | Salazar et al. |
| 2014/0238681 A1* | 8/2014 | Trygstad ................ E21B 41/00 166/303 |

\* cited by examiner

SYSTEM AND METHOD FOR CONTROLLING AND OPTIMIZING THE HYDROTHERMAL UPGRADING OF HEAVY CRUDE OIL AND BITUMEN

RELATED APPLICATION

This application claims the benefit of U.S. Provisional Patent Application Ser. No. 61/770,638, entitled System and Method for Controlling and Optimizing the Hydrothermal Upgrading of Heavy Crude Oil and Bitumen, filed on Feb. 28, 2013, the contents of which are incorporated herein by reference in their entirety for all purposes.

BACKGROUND

Technical Field

This invention relates to hydrocarbon processing, and more particularly to systems and methods for efficiently upgrading heavy crude oil.

Background Information

Introduction to Heavy Crude Oil

The average weight or density of crude oils extracted from oil fields globally has been increasing very gradually over time, a trend expected to continue indefinitely. However, the existence of large reserves of heavy and extra-heavy crude oils in some countries means that the as-produced weight of crude oil can increase much more rapidly on a regional basis. Of particular importance are the tar oils in the Orinoco Belt in Venezuela and oil sand bitumen in Alberta, Canada, which in aggregate are currently estimated as being 2-3 times the size of the oil reserves in Saudi Arabia. The density of Saudi Arabian crude oils, expressed as API gravity or ° API, may typically fall in the range of about 27-34° API, in the center of which falls the current global average. By contrast, the deposits in Venezuela and Alberta are generally characterized as being heavy crude oils (HCO) or extra-heavy crude oils (EHCO) for which the corresponding densities may be regarded generally as being below about 22.3° API and about 10° API, respectively. (The lower the ° API value, the higher the density.) For deposits that are heavier still, such as in the case of some natural bitumen deposits in Alberta, the term ultra-heavy crude oil (UHCO) is sometimes applied. In most cases, the densities of native, unmodified heavy crude oils produced in Venezuela and Alberta are below about 15° API, and even below 10° API. (Though the classification scheme used herein to differentiate crude oils in terms of ° API will be recognized by those skilled in the art, other conventions and criteria exist, which may apply different terms and ° API ranges and/or include other criteria such as viscosity and percent sulfur. Therefore, definitions used herein should not be regarded as limiting but only illustrative.)

From the viewpoint of crude oil production and transport, HCO, EHCO, and UHCO, the entire group of which shall hereinafter be referred to inclusively as heavy crude oils (HCO) without limitation as regards exact composition or geological or geographic origin, are problematic because the same physico-chemical characteristics that cause their elevated density produce a corresponding increase in viscosity. By way of illustration that is neither bound by theory nor intended to be complete or applicable to all crude oils, asphaltenes are a class of diverse compounds known to affect density and viscosity directly and to have concentrations in HCO that are generally higher than in medium and light crudes. Having molecular weights that are high relative to other compounds in crude oils generally, increasing asphaltene concentration is generally accompanied by an increase in both density and viscosity. This may be due to the tendency of asphaltenes to self-associate, or it may be due to the formation of dense microscopic particles comprising a dense core of aggregated asphaltenes surrounded by layers of other crude oil components. Regardless of the mechanisms by which composition and microscopic structure cause elevated density and viscosity, HCO is generally not amenable to the methods of transportation and storage commonly applied to medium crude oils (about 22.3° API to about 31.1° API) and light crude oils (greater than about 31.1° API). For example, if crude oil were required to have a minimum ° API value of about 20 to be pipelineable, and if transport by rail tank car is precluded on the grounds of practical economics and logistics, then delivery to market of crude oil extracted from Albertan oil sands requires that it be somehow upgraded to meet pipeline specifications for density and viscosity.

Approaches to Upgrading Heavy Crude Oils

Commercially relevant upgrading strategies currently applied in Alberta fall into two general categories. In the first, coking, hydrocracking, or other techniques are applied to HCO to chemically convert asphaltenes and other heavy components into lighter materials, which are recovered through distillation and blended to produce pipeline quality synthetic crude oil. The various conversion and recovery processes are related to those employed in oil refining and the overall approach is correspondingly capital intensive, adding an estimated $14 per barrel. Furthermore, economic considerations preclude an implementation strategy whereby smaller-scale upgrading facilities may be located in or near numerous production fields.

Producers therefore rely on another, simpler strategy whereby the bitumen and heavy oil are mixed with higher-value, lighter petroleum products at the wellhead to produce diluted bitumen (dilbit) that can be easily transported through pipelines. However, several significant issues are associated with dilbit. First, the diluent must be transported by rail or pipeline to production fields from distant refineries or gas processing plants where it is produced. Second, dilbit in pipelines typically contains about 25% to 40% diluent, effectively reducing the net capacity of pipelines to carry unrefined crude. Compounding these issues, the net cost for diluent in terms of both the material itself and the facilities required to handle it adds $10-$16 per barrel of dilbit. However, beyond infrastructure and cost considerations looms a broader problem, namely, that diluent-based upgrading may not be a practical way to meet future growth of Canadian HCO production. Absent an alternative approach, Canada will be required to import ever increasing quantities of diluents. Currently, efforts are underway to expand the pipeline infrastructure from the Gulf Coast of the United Stated all the way to Alberta via Illinois to carry the "pentane plus" condensate by-product of shale gas production.

The need exists in the art for a new approach that requires lower initial capital investment, has lower ongoing operating costs, and combines the best features of the two main upgrading methods used currently: reduction of the density and viscosity of the native crude through conversion of asphaltenes and other heavy components into lighter ones; and scalability that permits distributed implementation at or near the wellhead to minimize or eliminate the reliance on diluent from remote sources.

SUMMARY

According to one aspect of the present invention, a system is provided for upgrading a continuously flowing process stream including heavy crude oil (HCO). The system includes a fluid flow path configured to convey the process stream continuously therethrough in a downstream direction. The flow path includes a reactor configured to receive the process stream in combination with water, at an inlet temperature within a range of about 60° C. to about 200° C. The reactor includes one or more process flow tubes defining an aggregated interior cross-sectional dimension transverse to the downstream direction, the flow tubes having a combined length of at least about 30 times the aggregated interior cross-sectional dimension. The reactor applies heat to progressively heat the process stream to an outlet temperature T(max)1 within a range of between about 260° C. to about 400° C. The reactor is also configured to maintain the process stream at a pressure sufficient to ensure that it remains a single phase at T(max)1. A controller is configured to selectively adjust the rate of flow of the process stream through the reactor to maintain a total residence time in the reactor of greater than about 1 minute and less than about 25 minutes. This rate of flow, in combination with the flow tube length and cross-sectional area, and the progressive application of heat, are configured to minimize or prevent coke formation.

In another aspect of the invention, a method for upgrading a continuously flowing process stream including heavy crude oil (HCO) includes supplying the process stream to the aforementioned system.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

Figure 1:
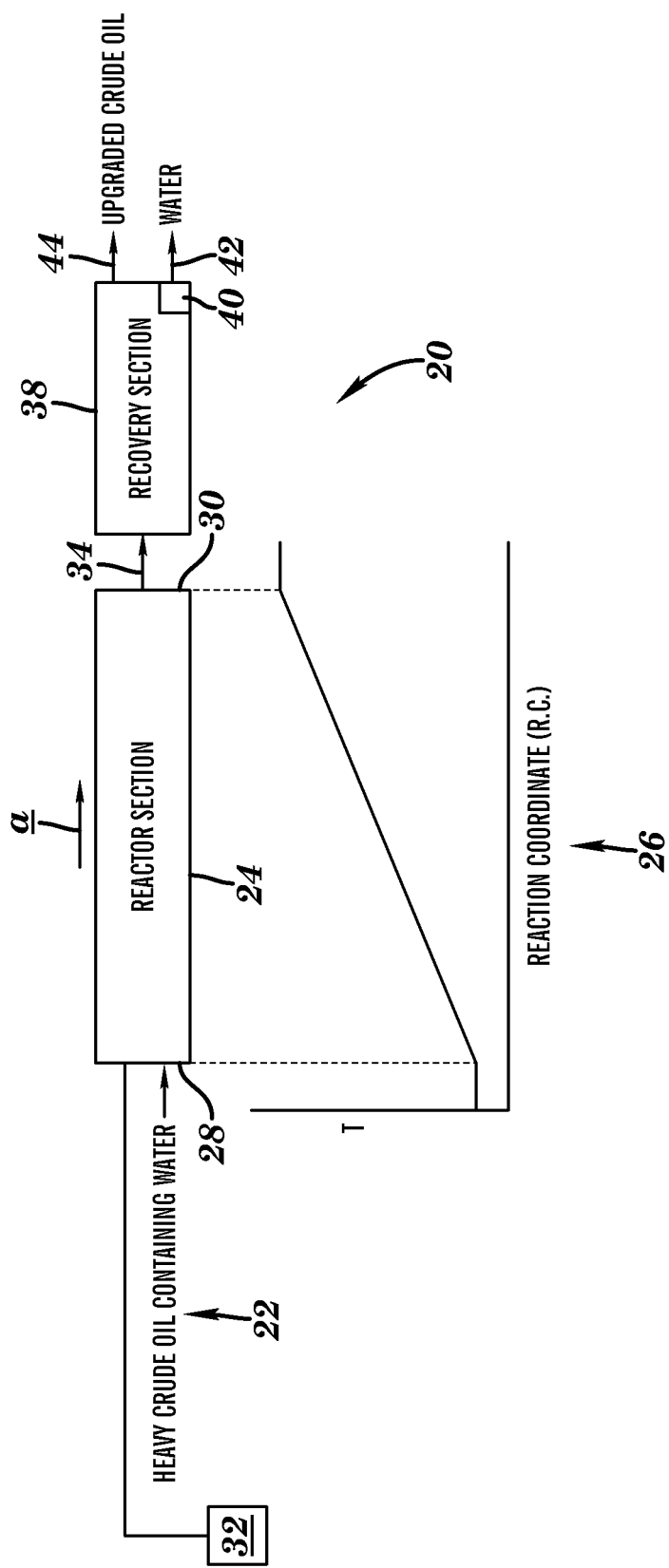
FIG. 1 is a schematic diagram of a representative embodiment of a hydrothermal heavy crude oil (HCO) upgrading system of the present invention.

As will now be described in detail, embodiments of the present invention relate to upgrading a continuously flowing stream including heavy crude oils, extra-heavy crude oils, ultra-heavy crude oils, bitumen, and the like without limitation in regard to exact composition or geologic or geographic origin, which hereinafter are referred to inclusively as heavy crude oils or simply HCO. Indeed, as used herein, the term "heavy crude oil" and/or "HCO" refers to substantially any crude oil or hydrocarbon-containing material measuring at or below about 22.3° API, with lower ° API values corresponding to higher densities. Referring to FIG. 1, in one example, a system 20 is provided for the hydrothermal upgrading of a process stream (reaction mixture) 22 (HCO and water) by a reactor portion (section) 24 configured to progressively heat the process stream 22 as a function of the reaction coordinate (R.C.) 26. The R.C. 26 may be calculated as (a) the relative distance between an inlet 28 and outlet 30 traversed by the process stream 22 within the reactor section 24, or (b) the time elapsed after the reaction mixture 22 enters the reactor section at 28, times flow rate divided by the total volume of the fluid flow path within the reactor section 24. In FIG. 1, the rate of heat applied (rate of heat transfer or thermal flux) to the reaction mixture 22 is shown graphically as temperature (T) of the process mixture 22 (on the y-axis), as a function of the R.C. 26 (on the x-axis.) Moreover, in particular embodiments, the thermal flux or temperature applied at the reactor 24 is increased progressively along the downstream direction a. This progressively increasing thermal flux may be provided, for example, by an otherwise conventional counter-flow heat exchanger such as the shell-and-tube heat exchanger shown and described hereinbelow with respect to FIGS. 7, 8 and 11. It should be recognized, however, that substantially any type of heater known to those skilled in the art, e.g., arranged in series with one another along the process fluid flow path may be used, without departing from the scope of the present invention.

Figure 11:
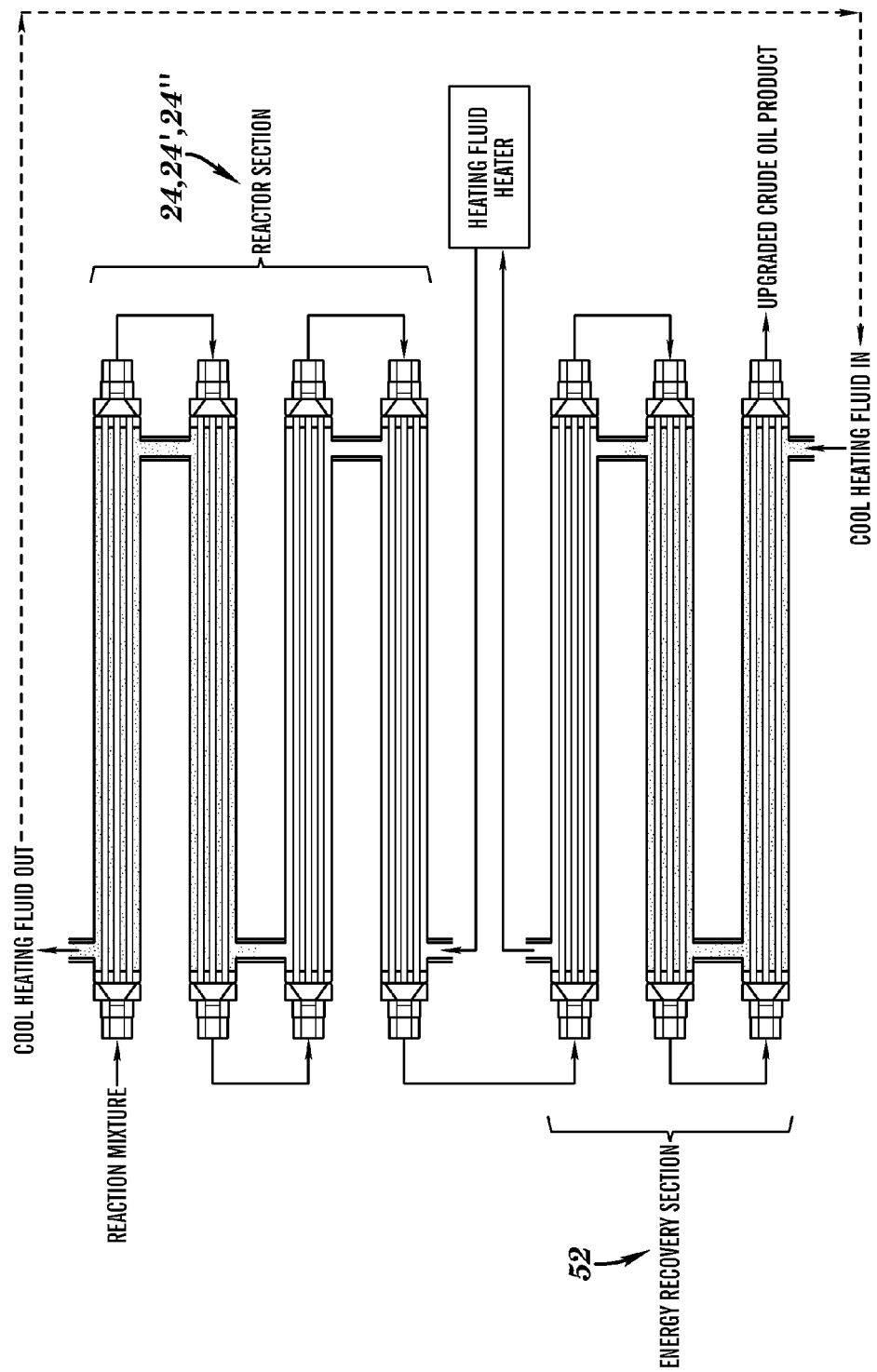
FIG. 11 is a schematic diagram of still other reactor portions usable with embodiments of the present invention.

In particular embodiments, the reactor section 24 includes one or more process flow tubes each having an interior cross-sectional dimension (e.g., diameter) in a plane extending transversely to the downstream direction a therethrough. In this regard, it should be recognized that the process flow tubes may be disposed in series, such as shown and described hereinbelow with respect to FIG. 7, and/or in parallel, as shown in FIG. 11. Regardless of whether the flow tubes are disposed in series, in parallel, or in a combination thereof, the flow tubes are provided with a combined length of at least about 30 times the aggregated interior cross-sectional dimension. For purposes of computing the aggregated interior cross-sectional dimension, flow tubes disposed in series are treated as a single tube. Therefore, for example, a reactor having one or more flow tubes in series, each with a diameter of 5 cm would have an aggregated cross-sectional dimension of 5 cm and a total length of at least 30×5 cm or about 150 cm. Similarly, a reactor having three parallel flow tubes each having a diameter of 5 cm, would have an aggregated cross-sectional dimension of 15 cm and a length of at least about 450 cm. Moreover, although these examples contemplate flow tubes of circular cross-section, one skilled in the art will recognize that tubes of substantially any shape cross-section, such as square, oblong, etc., may be used without departing from the scope of the present invention.

The reactor 24 is configured to apply heat to the reaction mixture flowing therethrough, to progressively heat the reaction mixture 22 so that the reaction mixture is disposed at a lower temperature at an upstream or inlet portion of the reactor, e.g., at 28, than at a downstream or outlet portion of the reactor, e.g., at 30. In particular examples, the reactor 24 is configured to progressively heat the reaction mixture 22 from an inlet 28 temperature of about 60° C. to 200° C., to an outlet 30 temperature (T(max)1) of between about 260° C. and 400° C. It should be noted that this progressive heating may be accomplished either substantially continuously, as shown in FIGS. 1-7, or discontinuously, as will be discussed in greater detail hereinbelow with respect to FIGS. 8-10. It is also noted that the reactor 24 is configured to maintain the reaction mixture 22 at a pressure sufficient to ensure that the reaction mixture remains a single phase at T(max)1, i.e., to substantially prevent formation of a gas phase separate from the liquid phase of the reaction mixture 22. In various exemplary embodiments, pressure within reactor 24 may be maintained within a range of about 1500 to about 3000 psia, with particular embodiments being maintained within a range of 1500 to 2000 psia, and other embodiments being maintained within a range of about 2000 to 3000 psia.

As also shown, system 20 may also include a controller 32, e.g., in the form of a conventional closed-loop programmable logic controller (PLC) or process automation controller (PAC) such as the model T2750 commercially available from Foxboro (Invensys Systems, Inc., Foxborough, Mass., USA), optionally augmented with model predictive control (MPC) capability, communicably coupled to reactor 24, including a flowmeter and temperature and pressure probes associated therewith (not shown) for capturing the flow rate, temperature and pressure of the process stream 22. The controller 32 is configured to adjust both the rate of flow of reaction mixture 22 into the reactor 24, and/or the rate of heat applied (rate of heat transfer or thermal flux) to the reaction mixture 22 in the reactor 24 (e.g., by controlling operation of hardware commonly associated with process flow, such as pumps, valves, heaters, etc. (not shown)). In particular embodiments, controller 32 is configured to ensure that the flow rate is sufficiently high and the rate of heat transfer is sufficiently low to minimize or substantially prevent coke formation, while maintaining a total residence time of the reaction mixture 22 within the reactor 24 of greater than about 1 minute and less than about 25 minutes, calculated as the total volume of the fluid flow path within the reactor divided by the flow rate, to form a product mixture 34 exiting the reactor at 30. It is noted that both the flow rate and the thermal flux from the inside surface of the tube or tubes in the reactor section may be optimized to minimize or prevent coke formation while achieving the desired level of upgrading and maximizing throughput, while taking into consideration the thermal conductivity of the reaction mixture 22.

As also shown, system 20 includes a recovery portion (section) 38 configured to receive the process stream, which has now been transformed into product mixture 34, exiting the reactor section at 30. Recovery section 38 is configured to reduce the temperature of the product mixture 34, e.g., to between 60° C. and 200° C., and to also effect a corresponding reduction in the vapor pressure of the mixture 34. It is also noted that in particular embodiments, recovery section 38 includes a water separator 40 configured to separate water from the upgraded crude oil, which exit the recovery section 38 at 42 and 44, respectively.

An aspect of the present invention is thus the gradual heating of reaction mixture 22, including an HCO stream and water, flowing through reactor section 24, on a time scale configured to promote, at relatively low temperatures, the disaggregation of HCO components and their substantially uniform distribution in the matrix of the reaction mixture, and additionally at higher temperatures upgrading reactions, all the while minimizing or preventing coking. It is noted that the use of tube reactors in petrochemical processing to effect chemical transformations is commonplace. For example, it is the standard approach for cracking of gas-phase naphtha at temperatures in excess of 800° C. to produce ethylene. It is noted, however, that the use of tube reactors to effect the chemical transformation of liquids at the relatively lower temperatures is rather uncommon or absent in commercially relevant processes used in either in refining or petrochemical operations.

Another aspect of the present invention is that instead of the reactor having a substantially uniform temperature distribution, the flowing mixture 22 instead experiences a deliberately non-uniform application of heat (thermal flux) between the inlet 28 and the outlet 30. Though not wishing to be bound by any particular theory of operation, the belief is that the aforementioned approach facilitates upgrading by fostering sequentially two different physico-chemical processes. First, as discussed briefly above, the use of time and the application of progressively increasing temperatures between the inlet and outlet of the reactor section serves to disintegrate physical structures in HCO and/or effect the dissolution of HCO components to yield a substantially uniform dispersion by the point where the mixture reaches a temperature of about 80% to about 90% of the predetermined maximum temperature at some point before the outlet. The process of disaggregation, disintegration, or destructuring of assemblages of HCO components and the dispersing and/or dissolution of the same will be inclusively referred to hereinafter as the disaggregation reaction or simply disaggregation. Through disaggregation, asphaltenes and other heavy compounds that are generally associated in HCO are thought to be dispersed and nominally separated from one other, predisposing them to undergo upgrading reactions involving water and minimizing the possibility that they thereafter will undergo retrograde reactions with each other that lead to the formation of more and larger asphaltenes molecules and possibly coke. The process that yields product qualities such as density and viscosity that are improved over those of the HCO feed due to upgrading reactions involving heavy components originating in HCO will be referred to inclusively as the upgrading reaction or simply upgrading.

Figure 10:
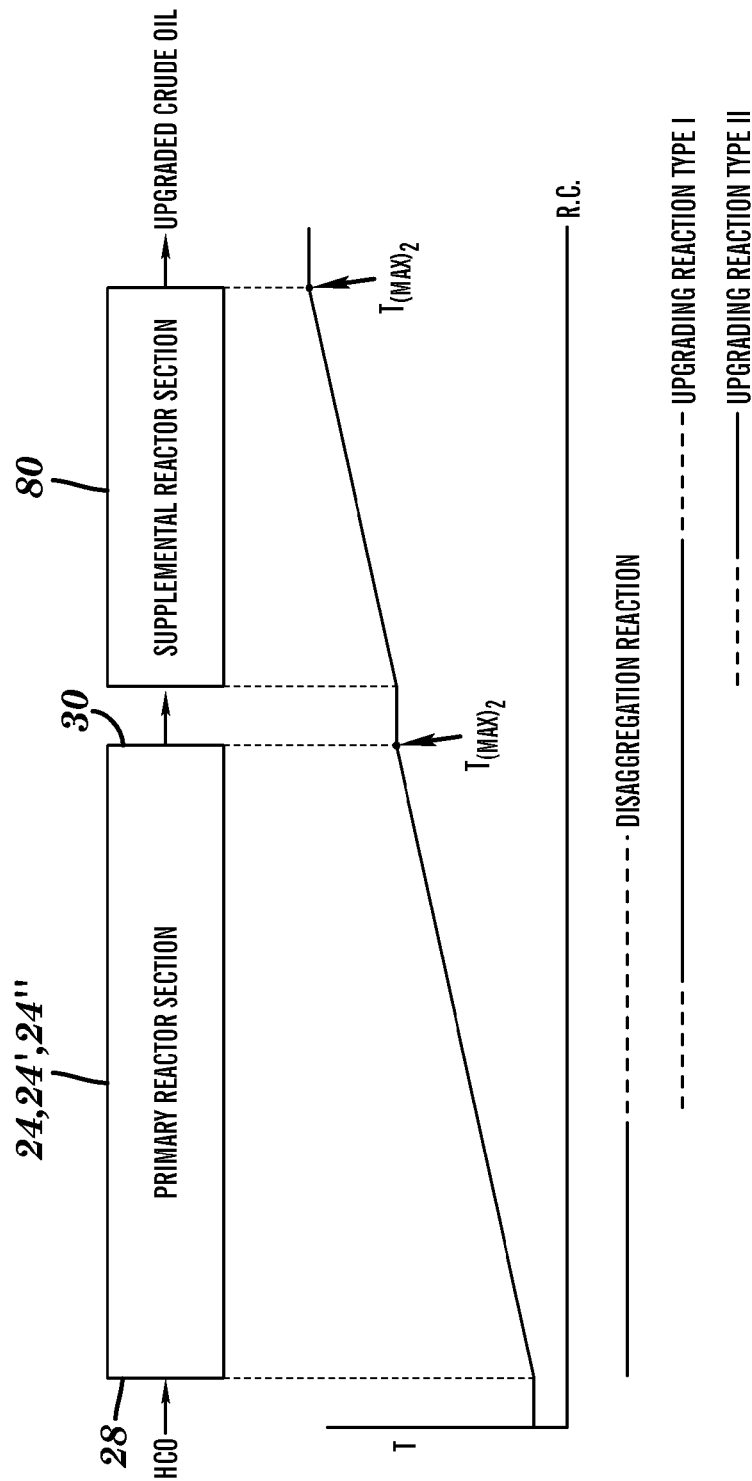
FIG. 10 is a schematic diagram of still other reactor portions usable with embodiments of the present invention.

It will be understood that the embodiments shown and described herein for upgrading HCO do not purport to selectively and/or exclusively promote first the initial disaggregation reaction and subsequently the upgrading reaction, nor is there a presumption that the latter occurs only when the temperature of the reaction mixture reaches and exceeds temperatures of between about 80% and 90% of the predetermined maximum temperature. Rather, the reaction mixture will predominantly undergo disaggregation reactions at lower temperatures in the reactor section while upgrading reactions occur predominantly at the higher temperatures in the reactor section. Indeed, as shown in FIG. 10 (discussed in greater detail hereinbelow) an aspect of embodiments of the present invention is the fostering of the disaggregation of HCO components prior to their being subjected to conditions of elevated temperature at which upgrading reactions occur, maximizing the efficiency and extent of upgrading at the highest temperatures while minimizing undesirable side reactions that lead to coke formation.

Figure 2:
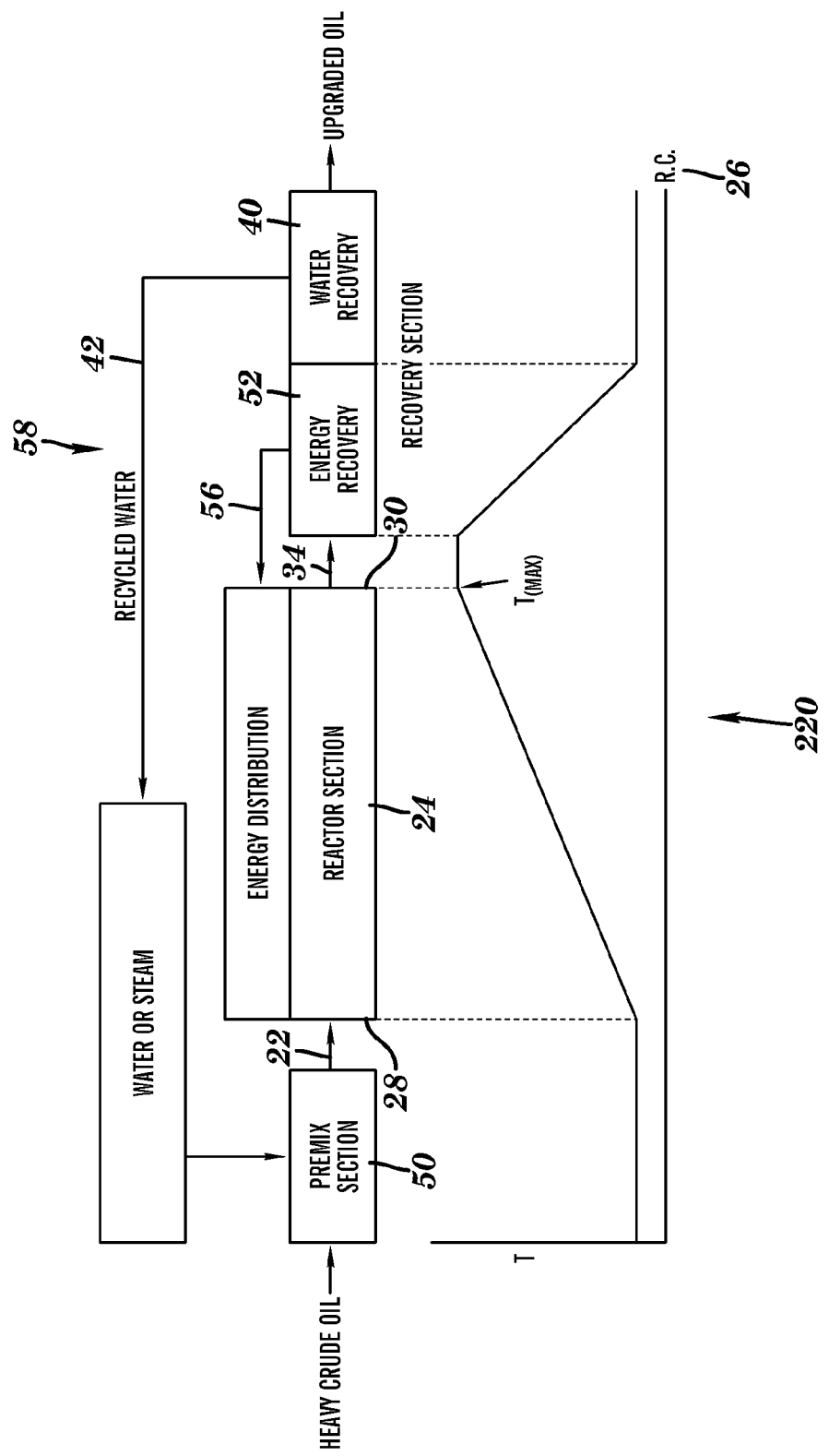
FIG. 2 is a schematic diagram of the embodiment of FIG. 1, with various optional features.

Turning now to FIG. 2, the controlled, progressive increase in the temperature of the reaction mixture between the reactor section inlet and outlet is but one aspect of the present invention that preferentially promotes, first, the disaggregation reaction and then the upgrading reaction. An additional approach for promoting disaggregation and upgrading reactions associated with various embodiments of the present invention involves the selection and contacting of the HCO stream in a premix section with materials selected to promote one or both of those reactions. In one embodiment of the invention, HCO flowing through a premix section 50 is contacted with a material including either water or steam at a temperature at or below the desired predetermined inlet 28 temperature of the process stream 22, e.g., at a temperature at or below about 200° C. In another embodiment the temperature of the water or steam contacting HCO flowing through the premix section may be as high as about T(max)1 or about 350° C., whichever is lower so as to avoid the promotion of localized cracking of HCO components at or near the point of contacting, which is thought to lead to coke formation. The mixture of HCO and this water or steam becomes the process stream 22 that is fed to the reactor section 24 at inlet 28.

Not wishing to be bound by any particular theory of operation, it is believed that the contacting of HCO, which has not substantially undergone disaggregation, with water whose temperature is greater than about 325° C. may promote coking due to localized high rates of cracking at or near the point of contacting followed by retrograde intermolecular reactions of components that are not substantially disaggregated within the reaction mixture 22. Thus, while coke formation by this mechanism may be minimized by ensuring that HCO components are substantially disaggregated prior to contacting with water that is supercritical (temperature and pressure are equal to or greater than about 374° C. and 3200 psia) or near-supercritical (e.g. temperature and pressure are in the range of about 325° C. to 374° C. and 2000 psia to 3200 psia, respectively), it is expected to be reduced even further through the promoting of disaggregation and the contacting with water whose temperature is less than about 325° C.

Thus, as shown, system 220 of FIG. 2 is substantially similar to system 20 of FIG. 1, while also including an optional premix section 50 for contacting the HCO with water or steam to form the process stream 22. As also shown, the recovery section of system 220 includes an optional energy recovery subsection (e.g., heat exchanger) 52, which is configured to recover thermal energy from the product mixture 34 and to distribute the recovered energy to the reactor section 24 as shown at 56. The energy removed from the mixture 34 is shown graphically as a reduction in temperature (T) as a function of R.C. 26. Still further, system 220 may include an optional water recycling loop 58 configured to recirculate the water 42 recovered at water separator 40, to the premix section 50, although it will be understood that other embodiments water used in contacting HCO in the premix section and/or the reaction mixture in the reactor section (discussed in greater detail hereinbelow) may be from sources instead of or in addition to water from the recycling loop.

Figure 3:
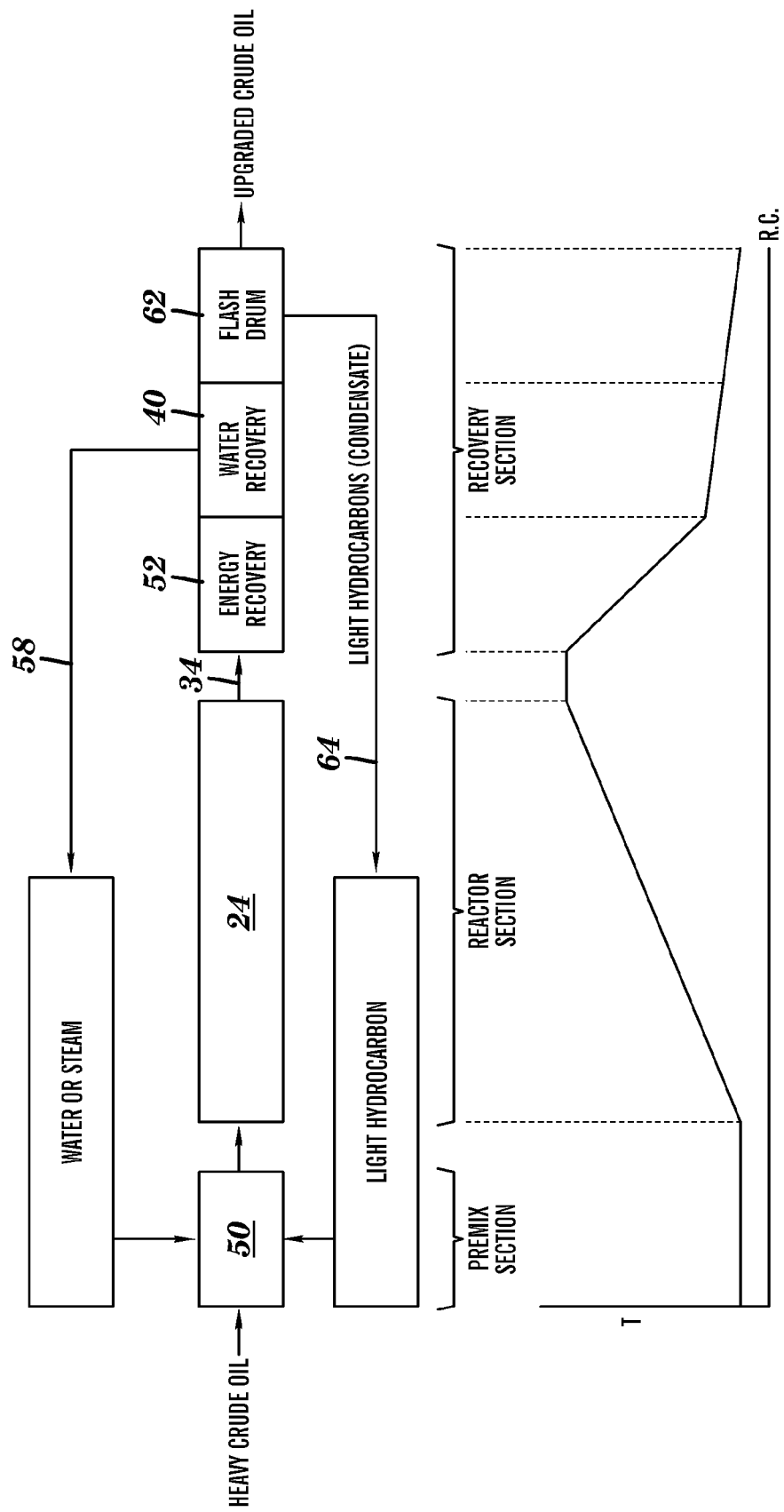
FIG. 3 is a schematic diagram of the embodiment of FIG. 2, with further optional features.

Turning now to FIG. 3, in another variation of the foregoing, a system 320 is substantially similar to system 220, with the addition to the recovery section of an optional light hydrocarbon removal device 62. An example of a suitable device 62 may include a conventional flash drum configured for recovering light hydrocarbons (e.g., naphtha, distillates, condensates and the like, hereinafter referred to simply as LHC) from the product mixture 34. The recovered LHC may then be recirculated via hydrocarbon recycling loop 64 back to the premix section 50, to help promote the disaggregation reaction.

Figure 4:
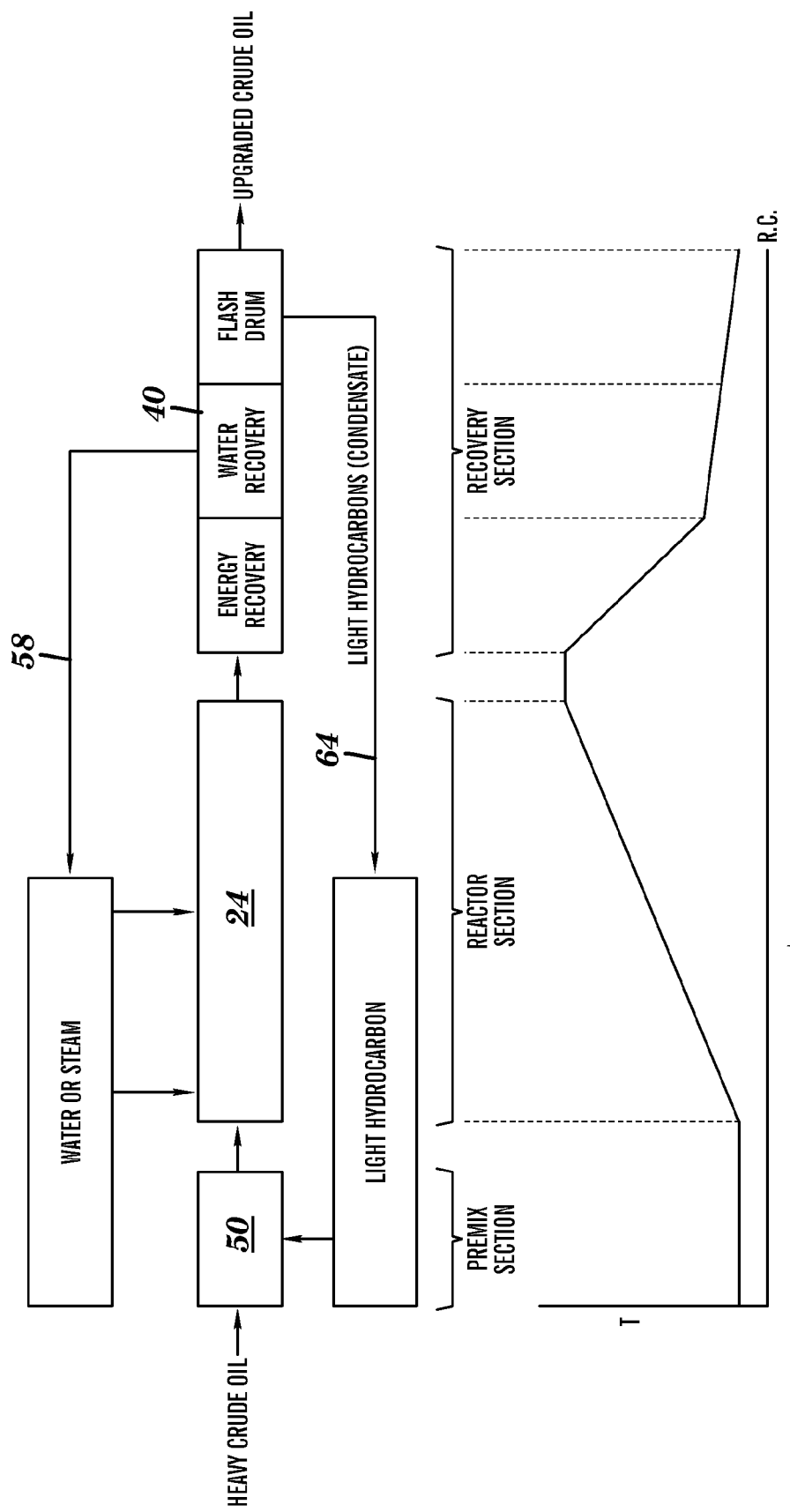
FIG. 4 is a schematic diagram of the embodiment of FIG. 3, with additional optional features.

Turning now to FIG. 4, in yet another variation of the foregoing embodiments, a system 420 is substantially similar to system 320, with the optional injection of water or steam (e.g., from recycling loop 58) at one or more points in reactor section 24 instead of the premix section 50. This effectively provides for contacting the HCO stream with the hydrocarbons, and therefore promoting the disaggregation reaction, prior to contacting the HCO with water or steam, which may be particularly effective for predisposing the reaction mixture 22 toward mixing with injected water or steam and undergoing upgrading reactions involving water at the higher temperatures found in the reactor section 24.

Figure 5:
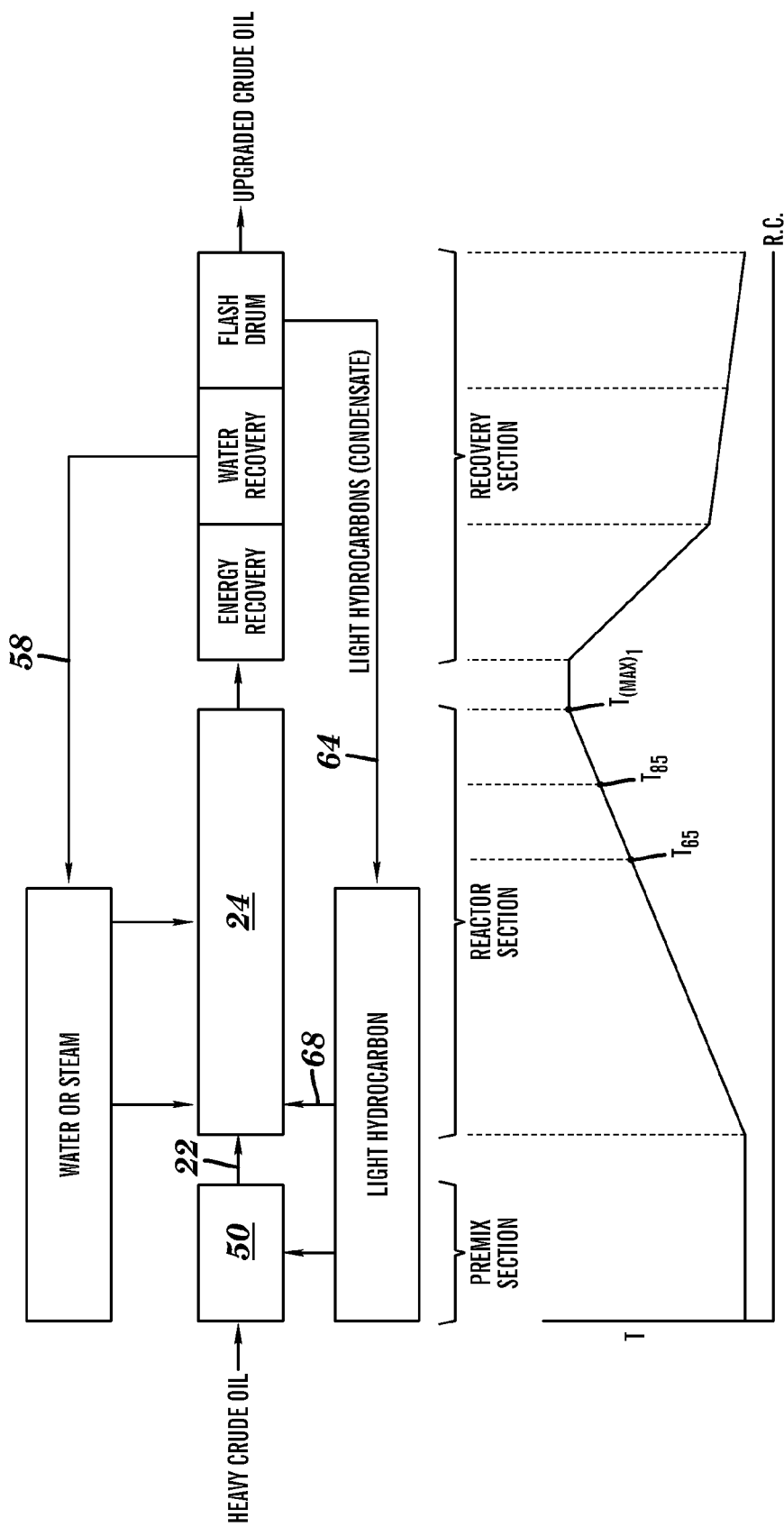
FIG. 5 is a schematic diagram of the embodiment of FIG. 4, with an additional optional feature.

In another variation shown in FIG. 5, a system 520 is substantially similar to system 420, with the optional injection of light hydrocarbon from recycling loop 64 into the reactor section 24 as well as premix section 50. It is noted that in particular embodiments, the injection of light hydrocarbon occurs at one or more points 68 prior to where the reaction mixture 22 has reached a temperature $T_{85}$ of between about 80% to 90% of the temperature T(max)1. In other embodiments, the injection of light hydrocarbon occurs at one or more points 68 prior to where the reaction mixture 22 has reached a temperature $T_{65}$ of between about 60% to 70% of the temperature T(max)1.

Figure 6A:
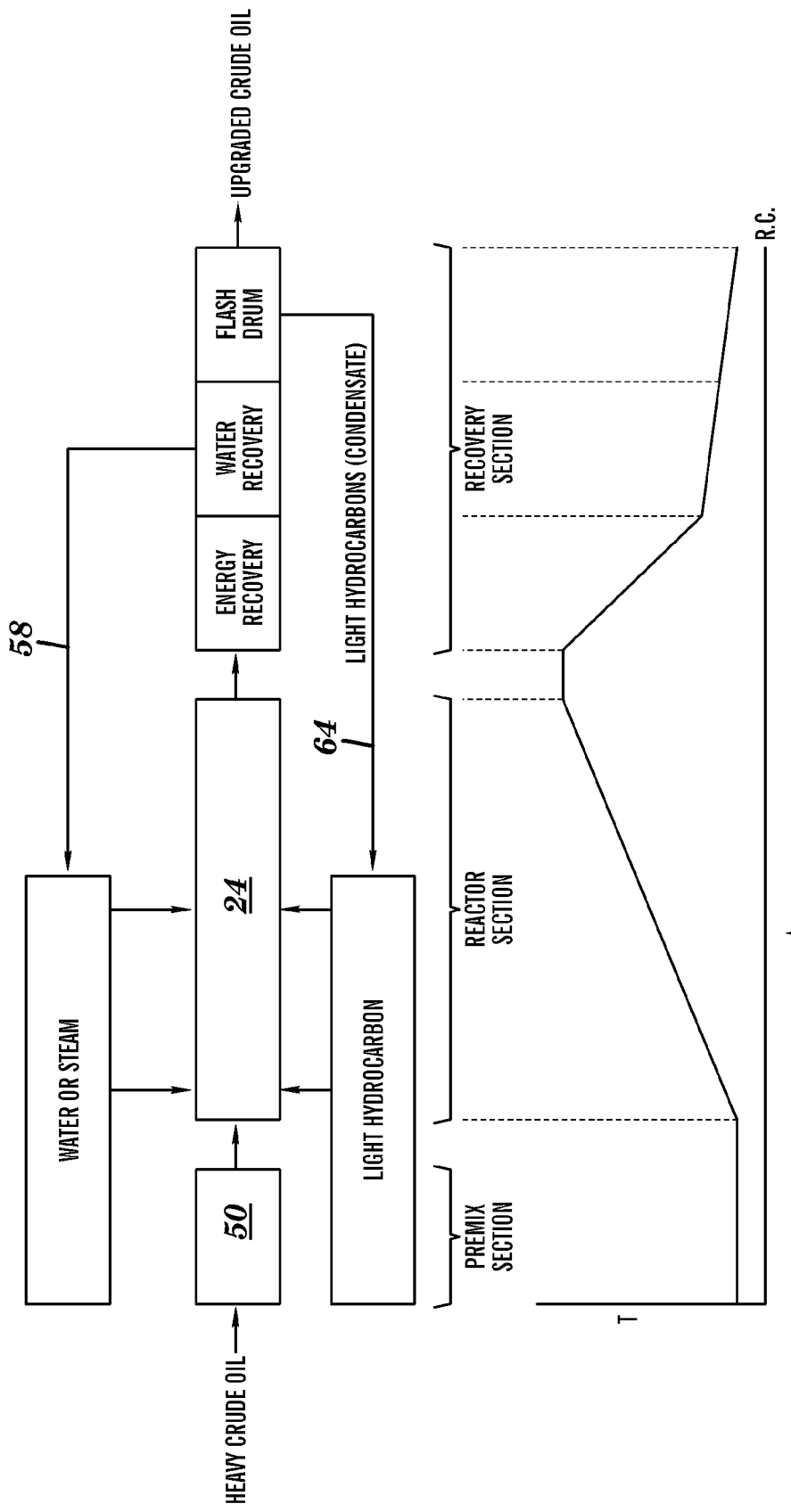
FIG. 6A is a schematic diagram of the embodiment of FIG. 3, with an additional optional feature.
Figure 6B:
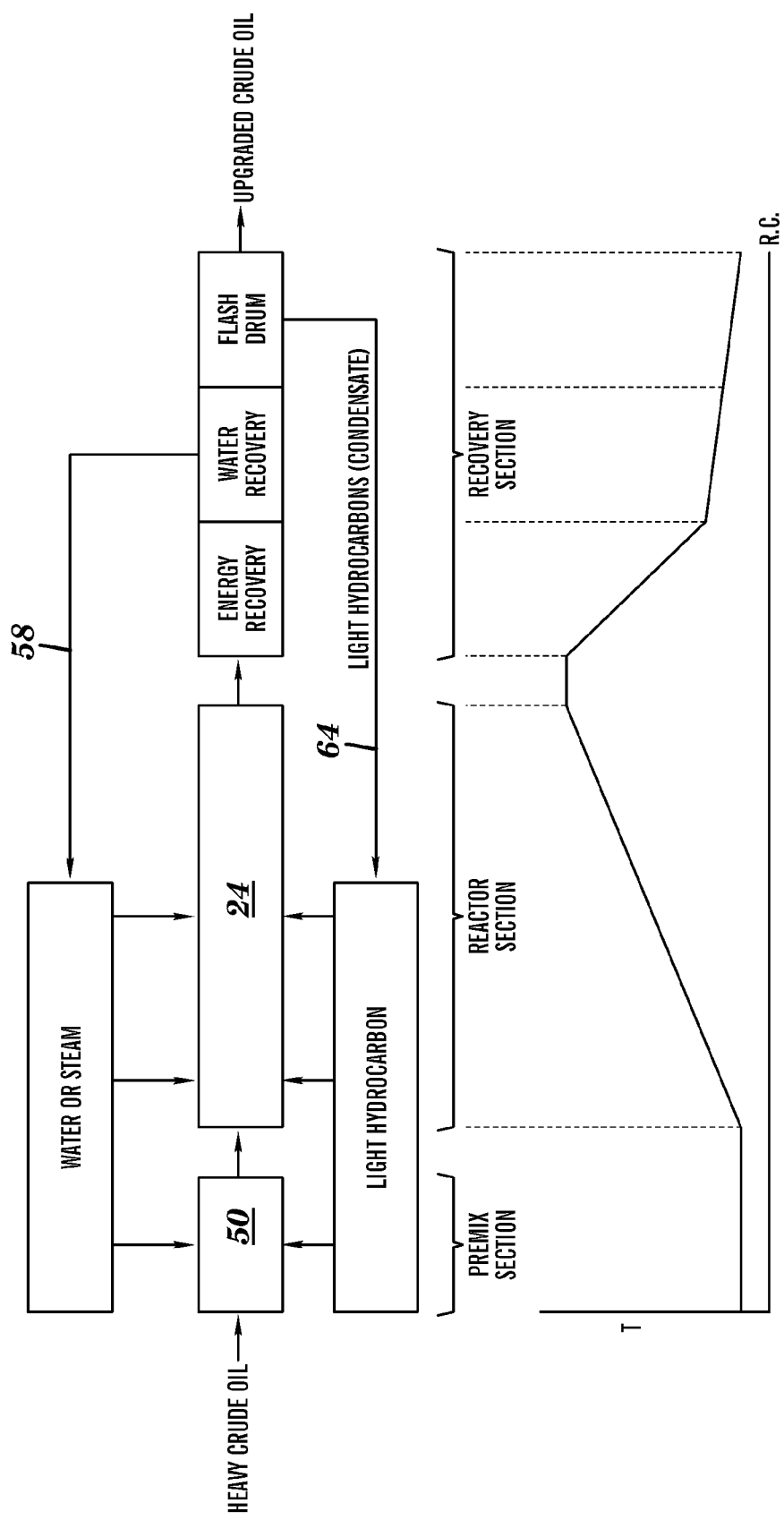
FIG. 6B is a view similar to that of FIG. 6A, with other optional features.

Turning now to FIG. 6A, system 620 is substantially similar to system 520, with the injection of light hydrocarbon and water/steam into reactor 24 without any injection into premix section 50. Thus, in this embodiment, no material is mixed with the HCO in the premix section (the premix section 50 is thus not required, although shown), although the HCO may contain water and/or LHC as the result of the steam assisted gravity drainage (SAGD) process in widespread use in Alberta for extracting and producing HCO from oil sands deposits, which HCO may be upgraded by embodiments of the present invention. Rather, water or steam are injected at one or more points in the reactor section 24 prior to the $T_{85}$ or $T_{65}$ points as discussed hereinabove. In this embodiment, it is also noted that at the point of injection the temperatures of the water or steam supplied by loop 58 may be equal to or less than about 80% to 90% of the predetermined maximum temperature in the reactor section T(max)1. In another embodiment, the temperature of the water injected into the reactor section may have temperatures greater than T(max)1 but less than about 350° C. System 620' of FIG. 6B is substantially similar to system 620, but with the additional injection of water/steam and hydrocarbon via loops 58 and 64, respectively, into premix section 50.

It is noted that in any of the embodiments shown and described herein, the contacting of water/steam and/or hydrocarbon with the HCO may be facilitated by a variety of conventional means including but not limited to mechanical stirring, inline mixing, static mixing, a mixing eductor, a radial (vortex) premixer, and/or a pump that continuously drives the reaction mixture 22 from the premix section 50 into the reactor section 24. Moreover, the examples shown and described herein are not intended to be limiting, with other combinations of injecting water/steam and hydrocarbons into the premix and reactor sections being included within the scope of the present invention.

Still further, in various embodiments described herein, the amount of water/steam and hydrocarbon supplied to the HCO in process stream 22 is configured to provide a final ratio of HCO to water (HCO:water) ranges from about 1:1 and 20:1, while the ratio of native HCO to LHC not native to the HCO (HCO:LHC) ranges from about 1:2 and 20:1. It is noted that the non-native LHC may be present in the HCO stream flowing into the premix section 50 or may be that which is introduced in either the premix section 50 or the reactor section 24.

The selection of the particular final value for HCO:water may be based on the balancing of two opposing factors. Higher relative concentrations of water may be beneficial in that they foster improved heat transfer from the walls of tube in the reactor section 24, suppress coke formation by quenching or preventing reactions between HCO components, and improve the kinetics of upgrading reactions involving water. Some disadvantages of relatively high water concentrations relate to the fact that displacement of HCO by water reduces the effective throughput of HCO while increasing operating costs due to the need to invest thermal energy to heat not only HCO but also water. Given that the heat capacity of the latter is approximately twice that of HCO and other hydrocarbons, each incremental increase in the water content of the reaction mixture requires proportionately more thermal energy to heat the reaction mixture to T(max)1. Because, in comparison with water, added light hydrocarbon is thought to be particularly effective for promoting the disaggregation reaction while suppressing the formation of coke, particular embodiments of the present invention, as discussed hereinabove, involve the initial contacting of the HCO by light hydrocarbon in the premix section 50 and the injection at one or more points later in the process (e.g., in the reactor section 24) of a minimum amount of water required to effect the desired level of upgrading without formation of unacceptable levels of coke. It will be understood that examples given hereinabove, which depict the contacting of HCO in the premix section and/or the reaction mixture in the reactor section by LHC recovered directly from the product mixture by the LHC removal device 62, are nonlimiting. In other embodiments, LHC may be used for such purpose which come from sources other than or in addition to the optional device 62.

Figure 7:
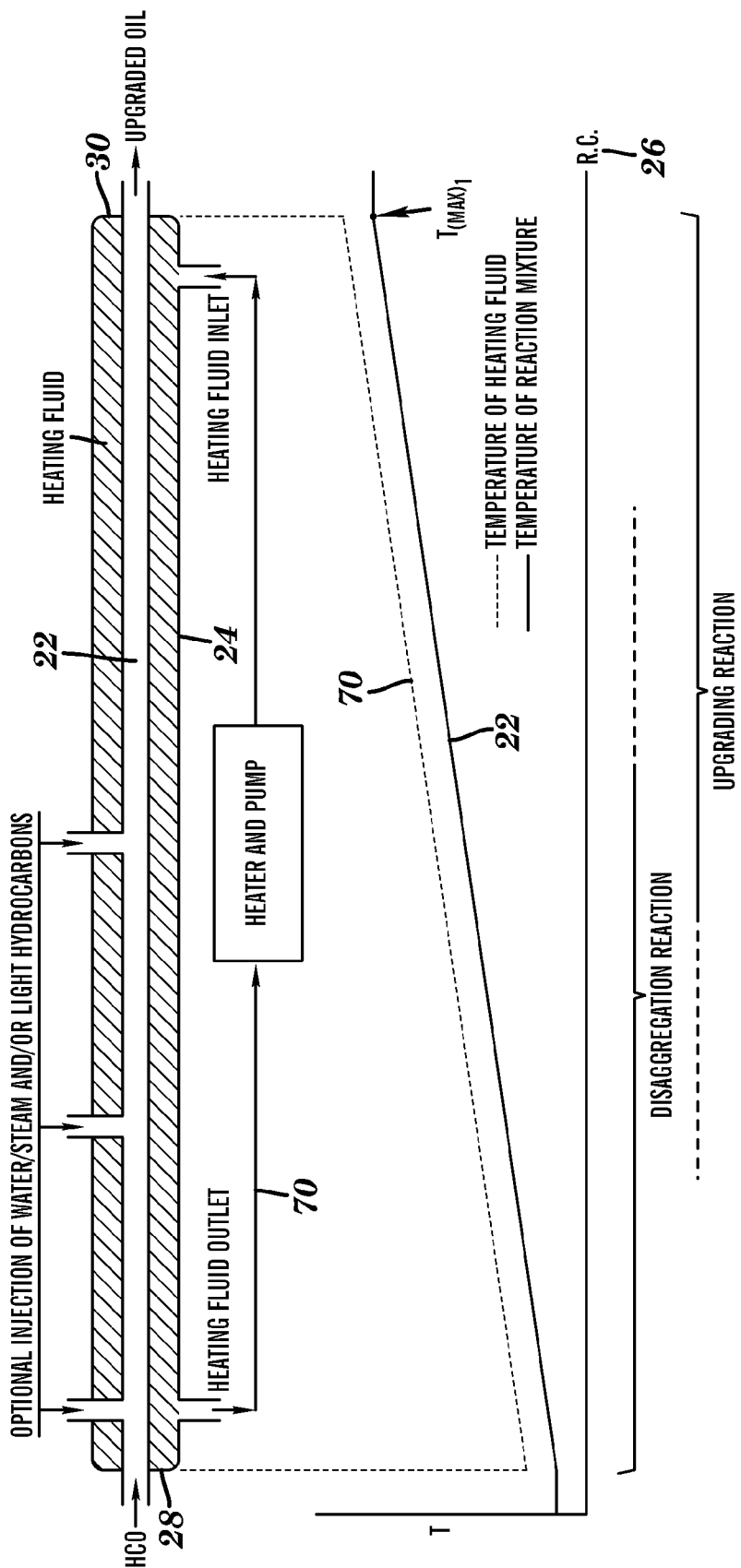
FIG. 7 is a schematic cross-sectional view of a reactor suitable for use in one or more of the embodiments of FIGS. 1-6B, with temperature represented graphically thereon.

Referring now to FIG. 7, in a nonlimiting example, the reactor section 24 is a conventional shell-and-tube heat exchanger in which the reaction mixture 22 flowing through a central tube is heated by a heating fluid 70 flowing in the direction opposite that of the reaction mixture 22. The heating fluid 70 flowing into the shell has a temperature sufficient to ensure that the temperature of the reaction mixture 22 at the outlet 30 of the reactor section 24 is at about the predetermined maximum temperature T(max)1. The flow rate and temperature of the heating fluid are adjusted to create a continuously-varying temperature profile along the length of the reactor section 24 as shown and described hereinabove with respect to the graphical components of the Figures. The temperatures of the reaction mixture 22 and the heating fluid 70 are shown graphically as a function of the reaction coordinate 26. The graphical component of FIG. 7 also indicates that the occurrence of the disaggregation reactions predominates at the inlet/low temperature end 28 of the reaction section 24, while the upgrading reactions predominate at the outlet/high temperature end 30 of the reaction section 24.

As also mentioned hereinabove, although reactor section 24 may take the form of a single-tube heat exchanger, the skilled artisan will recognize that reactor section 24 may alternatively include a heat exchanger having a plurality of parallel tubes within the shell, wherein the inlets of all the tubes are communicably coupled by a common inlet chamber and the outlets are communicably coupled by a common outlet chamber, such as shown in FIG. 11.

Figure 8:
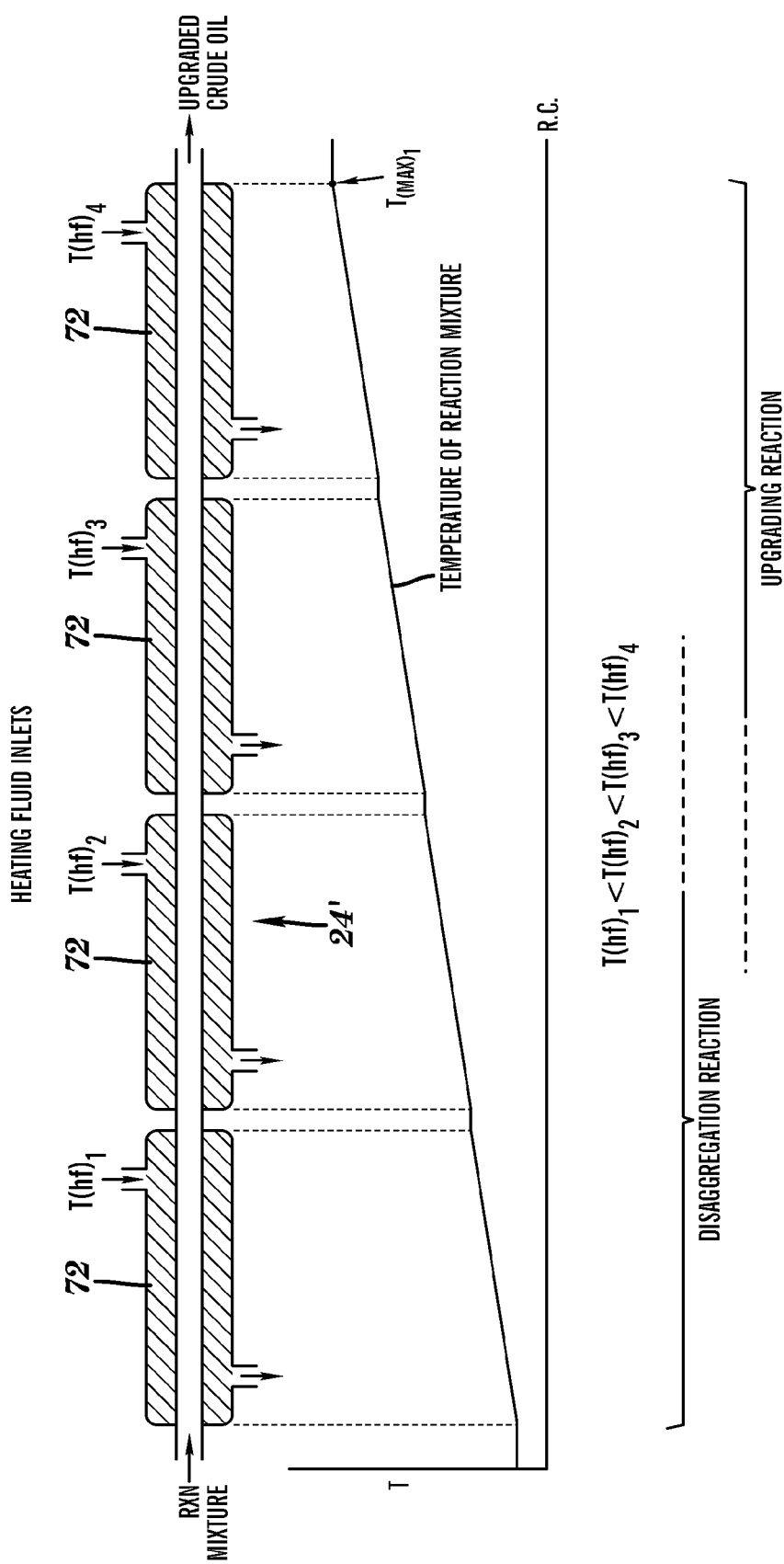
FIG. 8 is a view similar to that of FIG. 7, of an alternate reactor.

Turning now to FIG. 8, an alternate reactor section shown at 24' may take the form of a series of shell-and-tube subsections 72, where $T(hf)_i$ is the temperature of the heating fluid 70 at the inlet to each subsection. Reactor section 24 is otherwise substantially similar to reactor section 24, such as described with respect to FIG. 7.

Figure 9:
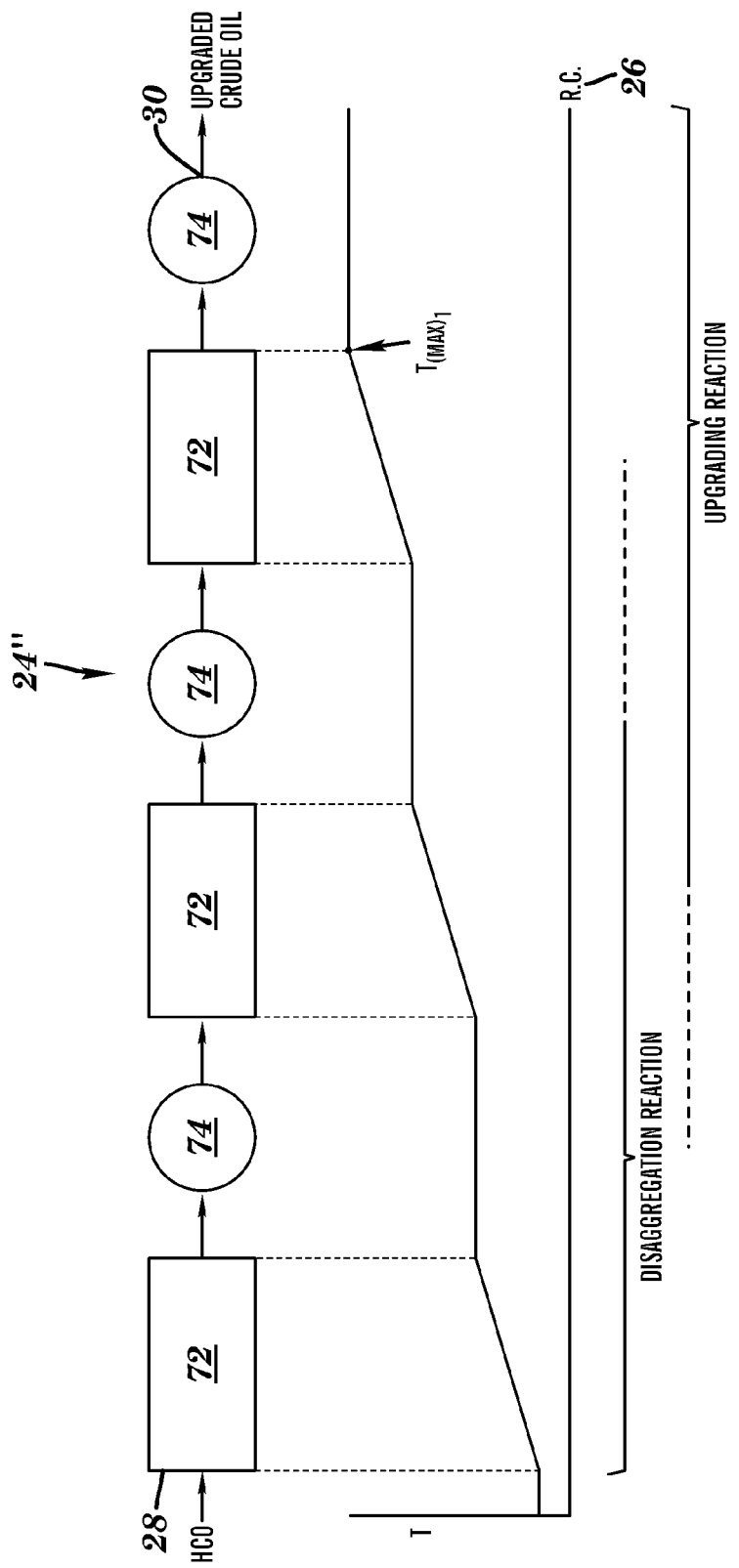
FIG. 9 is a schematic diagram of another alternate reactor portion usable with embodiments of the present invention.

Referring to FIG. 9, an optional reactor section 24" is substantially similar to reactor section 24', but with the interposition of thermal-soak chambers 74 disposed serially between the subsections 72. As shown graphically, the thermal-soak chambers 74 are configured as insulated, unheated flow-through chambers that effectively lengthen the residence time of the reaction mixture 22 at various temperatures as the mixture 22 flows through the reactor section 24". As shown graphically, the thermal-soak chambers 74 effectively provide a substantially step-wise increase in temperature as a function of the R.C. 26, e.g., along the length of the reactor section 24". The particular temperatures and the resulting residence time at those temperatures may be selected to facilitate kinetics related to the disaggregation and upgrading reactions. Moreover, although in particular embodiments the thermal-soak chambers 74 will be unheated, it should be recognized that in particular applications, it may be appropriate to apply some amount of heat to the thermal-soak chambers, such as may be desired to maintain the reaction mixture flowing therethrough at an approximately uniform temperature.

As discussed above, the graphical component indicates that the occurrence of the disaggregation reactions predominates at the inlet/low temperature end 28 of the reaction section 24", while the upgrading reactions predominate at the outlet/high temperature end 30 of the reaction section 24". It should be recognized that any number of the reactor subsections 72 of FIGS. 8 and 9 may be used, depending on the particular application. It should also be recognized that in various embodiments, pressure within the various components of reactors 24, 24', 24", is maintained at levels sufficient to prevent the formation of a phase separate from the liquid phase of reaction mixture 22, as discussed hereinabove.

Turning now to FIG. 10, any of the aforementioned reactor portions 24, 24', 24" may be further modified to include a supplemental reactor section 80 serially disposed at outlet 30 thereof. It is noted that supplemental reactor section 80 may be substantially similar to reactor section 24, 24', 24" and/or one or more reactor subsections 72. As shown, reactor section 24, 24', 24" effectively brings the reaction mixture 22 to T(max)1 as described hereinabove, while the supplemental reactor section 80 is configured so that the reaction mixture flowing therethrough achieves a predetermined maximum temperature T(max)2. In particular embodiments, T(max)2 is within a range of approximately 1.0 to 1.1 times T(max)1, and in other embodiments, is within a range of approximately 1.1 to 1.4 times T(max)1, as will be discussed in greater detail hereinbelow. Examples of reactor sections 24, 24', 24" and energy recovery sections 52 which include multiple parallel process flow paths as discussed hereinabove, disposed in series, are shown in FIG. 11.

In the foregoing embodiments employing serial heat exchangers, the temperature and rate of heating fluid flow through each shell may be individually controlled to control the temperature and rate of heat applied to the reactions mixture 22. Moreover, as also discussed hereinabove, the reaction mixture is maintained at pressure sufficient to maintain the reaction mixture as a single phase throughout the reactor section. Doing so is important from the viewpoint of process energetics because in general, liquid-to-gas phase changes consume significant energy as a function of the heat of vaporization, $\Delta H_{vap}$. The importance of this issue is particularly acute given that $\Delta H_{vap}$ for water may be 5-9 times higher than for many lower molecular weight hydrocarbons. Therefore, in a particular embodiment of the present invention, the reactor section is operated at pressures in excess of those required to maintain the reaction mixture in liquid phase when the reaction mixture experiences the maximum temperature in the reactor section. Higher pressures may also enhance the kinetics of the disaggregation reaction, the upgrading reaction, or both. Yet, any such benefit may be offset by higher equipment costs and operating costs, which include equipment maintenance. Therefore, in a particular embodiment of the present invention the reactor section is maintained at an operating pressure that is approximately 5% to 10% in excess of that required to maintain the reaction mixture as a liquid phase. That pressure varies as a function of the predetermined maximum temperature in the reactor section; the amount and chemical composition of LHC in the reaction mixture, whether they are native to the HCO, added to enhance disaggregation reactions, or generated through upgrading reactions; and the amount of water in the reaction mixture. Various embodiments use pressures within a range of from about 1500 to about 3000 psia. Under some conditions of temperature and reaction mixture composition, the required operating pressure may be approximately 2000 psia, while under other conditions the required pressure may be from about 1500 psia to about 2000 psi, while under yet other conditions the required pressure may be from about 2000 psi to approximately 3000 psia.

In various embodiments of the present invention, the predetermined maximum temperature at the outlet from the reactor section is kept as low as possible in consideration of energy costs, the aforementioned costs associated with building and maintaining processing equipment, and of the desire to minimize coke formation. However, doing so works at cross-purposes to the promotion of the disaggregation and upgrading reactions, which are enhanced as a function of increasing temperature. Consequently, another processing variable that plays a role in chemical kinetics must be exploited, namely, time.

The shell-and-tube configuration of the reactor section provides two important benefits, one stated and one implied. The former relates to the possibility for creating a deliberately non-isothermal temperature regime to preferentially promote disaggregation before applying maximum thermal energy to achieve predetermined maximum temperatures and drive upgrading reactions involving water. The implied benefit is the well-known enhancement of heat transfer by means of the high ratio of surface area to volume (surface:volume) available in tubular reactors. Yet, the latter benefit is achieved at the price of pressure drop between the inlet and outlet as a function of increasing tube length and decreasing tube cross-sectional dimension, both of which increase surface:volume. Therefore, the idea of increasing the total time spent by the reaction mixture in the reactor section by increasing the tubing length seems dubious. And though the problem may be mitigated by a variety of means, it ultimately is bounded by the interplay between three variables: the number and lengths of the tubes inside of a shell-and-tube system; the viscosity of the mixture flowing through them; and flow rate. The possibilities for reducing viscosity by increasing temperature or decreasing the amount of HCO relative to added light hydrocarbon or water are limited, as these measures tend to work in opposition to other considerations related to upgrading optimization. Similarly, reducing the flow rate serves primarily to reduce the throughput of HCO.

The present inventor's solution to the problem resides in an approach that reduces pressure drop by effectively increasing the diameters of tubes in the reactor section, which at first seems counterintuitive and even contrary to a key benefit noted for tubular reactors, namely, that they offer a high ratio of surface area to volume. However, in particular embodiments of the present invention, one or more flow-through chambers (thermal soak chambers) 74, that are only insulated and not heated will be interposed between individual reactor subsections, where the volume of the flow-through chambers 74 is equal to about the desired increase in residence time multiplied by the flow rate through the reactor section. For example, a single such chamber 74 of volume $V_C$ located in the reactor section before the $T_{85}$ point could increase by an average of one minute the time for the disaggregation reaction if $V_C = 1$ minute$\times F_{RM}$, where $F_{RM}$=the flow rate of the reaction mixture through the reactor section in units of volume/minute. (This does not take into account, of course, the consequence of flow-based mixing that might occur in the flow-through chamber.) Similarly, in another particular embodiment of the invention, the reactor section 24, 24', 24" is extended by the location of an insulated, unheated flow-through chamber 74 of volume $V_C = m \times F_{RM}$ at the outlet of the last shell-and-tube subsection in the reactor section where the reaction mixture is heated to about the predetermined maximum temperature T(max)1, resulting in the increase by m minutes the time available for upgrading reactions, where $F_{RM}$ is the flow rate of the reaction mixture in units of volume/minute. In yet another particular embodiment, the throughput of the upgrading system may be increased without significantly increasing the pressure drop across the reactor section by increasing the size of the flow-through chamber 74 installed at the outlet from the last shell-and-tube subsection, the size and number of flow-through chambers 74 interposed between the inlet and outlet, and the number of tubes contained in the shell-and-tube subsections 72. More than one shell-and-tube subsection 72 may be installed between the chambers 74.

Though not wishing to be bound by any particular theoretical reasoning, upgrading reactions in the reactor section of the instant invention are thought to be of two general types discussed briefly hereinabove. In the heterolytic scission of the covalent bond between two atoms, the electron pair is divided asymmetrically whereas homolytic scission results in the bonding electron pair being divided equally between the two bonded atoms. For convenience, the heterolytic and homolytic reactions of HCO components are discussed herein will be referred to hereinafter as upgrading reactions Type I and Type II, respectively. In the absence of catalysts, homolytic reactions may be promoted at elevated temperatures, an important example being the production of ethylene through the gas-phase cracking of naphtha at temperatures of about 850° C. Being highly endothermic ($\Delta H°$ has a high positive value), the entropy term of the Gibbs Free Energy equation $\Delta G°=\Delta H°-T\Delta S°$ prevails under such conditions. By contrast, heterolytic reactions may be promoted by catalysts that facilitate reactions by lowering the activation energy, which is generally desirable as this allows reactions to occur at lower temperatures than would be possible without a catalyst. An example is fluidized catalytic cracking (FCC) in refineries where FCC units play a vitally important role by increasing the yields of gasoline obtained from crude oil through the cracking of heavier hydrocarbons to form lighter ones. FCC catalysts are fine powders that function as a substrate onto which hydrocarbons adsorb in order for catalysis to occur. Other catalysts may be molecules that promote reactions by participating in them, in some cases being chemically integrated into reaction intermediates, but always being regenerated. The ability of water to function in this way is well known, and in a particular embodiment of the present invention, the reaction mixture in the reactor section is heated to a final predetermined temperature T(max)1 of about 260° C. to about 325° C. (or about 260° C. to about 400° C. in some embodiments) such that the upgrading rates due to water-catalyzed Type I reactions are thought to become significant when the reaction mixture reaches a temperature of about 80% to about 90% of T(max)1, where significant levels of homolytic cracking do not occur.

Though not wishing to be bound by any particular theory of operation, in particular embodiments of the invention the reaction mixture flows through a primary reactor section 24, 24', 24" and is heated to the predetermined maximum temperature T(max)1 where water-catalyzed Type I reactions are thought to occur without Type II reactions occurring at an appreciable rate, and then flows into a supplemental reactor section 80 (FIG. 10) appended to the primary reactor section where heating of the reaction mixture continues to a second predetermined maximum temperature of T(max)2. In this particular embodiment, the flow rate of, and the thermal flux into the reaction mixture are controlled to minimize or prevent coke formation in the reaction mixture as it is heated progressively while flowing through both the primary and the supplemental reactor sections.

In a particular embodiment, the predetermined maximum temperature T(max)2 of the supplemental reactor section 80 is between about 1.0 and 1.1 times T(max)1, the principal purpose of the supplemental reactor section being in this case to further drive Type I reactions to an extent beyond that which might have been achieved in the primary reactor section without appreciably fostering Type II reactions. In yet another embodiment, the supplemental reactor section raises the reaction mixture to a predetermined maximum temperature T(max)2 of between about 1.1 and 1.4 times T(max)1 to promote further upgrading by means of Type II reactions in addition to Type I reactions. Though not wishing to be limited by any particular theoretical reasoning, it is suspected that the benefit of such a strategy is that promoting first the Type I upgrading reactions in the primary reactor section reduces the average molecular weight of components in the reaction mixture to produce lighter compounds, which in turn serve to promote further disaggregation and even the dissolution of heavy components, minimizing the potential for coke formation or the retrograde formation of asphaltenes and other heavy components when subjected to thermal conditions conducive to Type II upgrading reactions in the supplemental reactor section.

In particular embodiments as discussed hereinabove, the recovery section 38 reduces the temperature of the product mixture to between about 60° C. and 200° C. The reduction in temperature results in a corresponding reduction in the vapor pressure of the product mixture and an increase in viscosity. Moreover, the product mixture 34 (FIG. 3) may flow under pressure through water separator 40, which may take the form of one or more liquid-liquid separators for the purpose of removing water. As discussed, recovered water can then be recycled in the process at 58 or used elsewhere, for example, it may be combined with water that is converted to steam for downhole injection in the context of the SAGD process for extracting HCO form oil sands. And as also discussed, in various embodiments, the product mixture from which water has been substantially removed flows into flash drum 62, having had its temperature reduced to a level appropriate to remove desired quantities of LHC at 64, e.g., by flash distillation of vapors, which LHC are referred to as condensate. The flash drum 62 may be appropriately configured to recover other volatile components in the product mixture that are lighter than condensate, which may include methane ethane, propane, hydrogen sulfide, $CO_2$, COS, $CS_2$, $SO_x$, and possibly nitrogenous compounds. In various embodiments as discussed above, the recovered condensate is used to facilitate the disaggregation reaction by contacting with HCO in the premix section 50 or injection into the reactor section 24, 24', 24".

Scalability is another among the many aspects of the present invention that have already been identified, and which are believed to be novel, non-obvious and beneficial. In particular, embodiments of the invention may be scaled without substantially changing the basic design to permit the construction of upgrading systems with capacities ranging from <1 barrel per day (bpd) to >10,000 bpd. This feature means that the present invention combines the best features of the two upgrading methodologies that enjoy broad use in Canada today. First, like the large, expensive technology used to produce synthetic crude oil, it offers the possibility to upgrade HCO to meet pipeline specifications without relying on dilution. Second, like diluent-based upgrading, the system and method described herein is suitable for distributed implementation on a smaller scale at or near wellheads and remote production fields.

Another aspect of the present invention is that particular embodiments maximize energy efficiency and ecofriendliness. For example, the recovery section 38 captures and recycles thermal energy and also water for reuse in the system and method described herein for upgrading HCO. Particularly beneficial is the ability to substantially minimize the thermal energy required to heat the reaction mixture to T(max)1, or to T(max)2, by substantially maximizing the ratio HCO:water. When the reaction mixture comprises only HCO and water, relatively large amounts of the latter are required because, apart from being involved in upgrading reactions, it is thought to be important for facilitating the dissociation and dispersal of HCO components in a water-dominated matrix. This latter function would not merely expose individual molecules such as asphaltenes to the upgrading reactions, but also suppress counterproductive retrograde or intramolecular reactions that could lead to the formation of undesirable products such as coke. By this strategy, the required amount of water relative to HCO is much greater than the minimum required only for actual upgrading reactions, and an energy penalty attaches to it because the heat capacity of water is approximately twice that of HCO. Embodiments of the instant invention address this dilemma by the mixing of HCO in the premix 50 and/or reactor 24, 24', 24" sections with LHC, e.g. those optionally recovered from the product mixture and recycled to the front end of the process, which are thought to facilitate disaggregation reactions without themselves being subject to appreciable additional chemical transformation in the reactor section. Subsequently, only the amount of water required to foster water-based upgrading reactions is added to the reaction mixture flowing through the reactor section. Not only does this approach help minimize energy requirements, but it offers the possibility to improve the kinetics of the disaggregation reaction because the LHC are presumably more effective than water in that regard.

Additional aspects of the invention concern the specific, deliberate design of the reactor section(s) to effect the gradual heating of the reaction mixture for the explicit purpose of a) avoiding levels of thermal flux into reaction mixture from the inside walls of the reactor to minimize or prevent coking; b) promoting disaggregation reactions by means of optionally contacting of HCO with LHC in the premix section and/or the reactor section; c) promoting disaggregation reactions prior to the reaction mixture reaching a temperature slightly below (e.g., between about 80% and about 90% of) the predetermined maximum temperature T(max)1; d) promoting upgrading reactions in a reactor section at temperatures between that point (e.g., about 80% to 90% of T(max)1) and about T(max)1 where Type I upgrading reactions are thought to occur; e) avoiding subjecting the HCO to localized heating at the point of injection of and contacting by water that has been heated to supercritical or near-supercritical temperatures when the HCO has not already undergone disaggregation, under which conditions the localized rate of heating exceeds the rate of disaggregation and instead promotes the formation of coke due to intermolecular reactions between HCO components and/or localized high rates of cracking, ostensibly by homolytic mechanisms; and f) optionally promoting further upgrading reactions in the reaction mixture flowing through a supplemental reaction section whose predetermined maximum temperature T(max)2 is between (i) 1.0 and 1.1 times T(max)1 where Type I reactions are thought to predominate, or (ii) 1.1 to 1.4 times T(max)1 where Type II upgrading reactions are thought to occur at the point in the supplemental reactor when the reaction mixture reaches a temperature greater than about 1.1 times T(max)1. It should be noted the various means described by which the invention minimizes the formation of coke effectively increase the yield of upgrading because coking converts HCO components into a low-value byproduct that has little value other than as fuel.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:

1. A system for upgrading a continuously flowing process stream including heavy crude oil (HCO), comprising:
    a fluid flow path configured to convey the process stream continuously therethrough in a downstream direction, the flow path including a reactor;
    the reactor configured to receive the process stream in combination with water, at an inlet temperature within a range of about 60° C. to about 200° C.;
    the reactor including one or more process flow tubes defining an aggregated interior cross-sectional dimension in a plane extending transversely to the downstream direction therethrough, the one or more flow tubes having a combined length of at least about 30 times the aggregated interior cross-sectional dimension;
    the reactor configured to apply heat to the process stream flowing therethrough, to progressively heat the process stream from the inlet temperature at an upstream portion of the reactor, to an outlet temperature T(max)1 within a range of between about 260° C. to about 400° C. at a downstream portion of the reactor;
    the reactor configured to maintain the process stream at a pressure sufficient to ensure that the process stream remains a single phase at T(max)1;
    a controller configured to selectively adjust a rate of flow of the process stream through the reactor to maintain a total residence time of the process stream in the reactor of greater than about 1 minute and less than about 25 minutes;
    wherein said rate of flow, said flow tube lengths, and said application of heat, are configured to minimize or prevent coke formation;
    wherein the reactor is divided into a series of reactor sub-portions spaced along the flow path;
    further comprising one or more unheated flow-through chambers disposed within the reactor flow path at the outlet from one or more reactor sub-portions, said one or more flow-through chambers being insulated, sized and shaped to facilitate kinetics associated with disaggregation and/or upgrading of HCO in the process stream flowing thereinto by lengthening residence time spent by the process steam at about the temperature at said outlet or outlets.

2. The system of claim 1, further comprising a recovery unit disposed downstream of the reactor in the fluid flow path, the recovery unit configured to recover thermal energy and water from the process stream, to reduce the temperature of the process stream flowing through the recovery unit to said inlet temperature, and to reduce vapor pressure of the process stream flowing through the recovery unit.

3. The system of claim 2, wherein the recovery unit comprises one or more separators configured to separate water, light hydrocarbons and any other volatile components in the process stream.

4. The system of claim 3, wherein the one or more separators comprises a flash drum.

5. The system of claim 4, wherein the recovery unit is configured to control recovery of thermal energy from the process stream to selectively adjust the temperature of the process stream flowing into the flash drum to facilitate recovery of light hydrocarbons.

6. The system of claim 2, configured to add one or more materials to the process stream upstream of the recovery unit, to form a substantially uniform dispersion.

7. The system of claim 6, configured to add the one or more materials to the process at one or more points upstream of a point at which the process stream reaches a temperature within a range of about 80% to about 90% of T(max)1.

8. The system of claim 6, configured to add the one or more materials to the reactor.

9. The system of claim 6, comprising a premixer disposed in the fluid flow path upstream of the reactor, the premixer configured to maintain and supply the process stream to the reactor at said inlet temperature, and further configured to add the one or more materials to the process stream.

10. The system of claim 6, wherein the one or more materials is selected from a group consisting of water, steam, light hydrocarbons, condensate, distillates, naphtha, and combinations thereof.

11. The system of claim 6, wherein the one or more materials comprises water.

12. The system of claim 11, wherein water is supplied to the process stream to provide a ratio of HCO to water (HCO:water) within a range of from about 1:1 to 20:1.

13. The system of claim 11, wherein the one or more materials comprises light hydrocarbons.

14. The system of claim 13, wherein light hydrocarbons are supplied to the process stream to provide a ratio of native HCO to light hydrocarbons (LHC) not native to the HCO (HCO:LHC) within a range of from about 1:2 to 20:1.

15. The system of claim 13, further configured to add the light hydrocarbons to the process stream at a location upstream of a location at which water is added to the process stream.

16. The system of claim 15, being configured to add the light hydrocarbons to the process stream at a location at which the process stream is within a range of about 60% to about 70% of T(max)1.

17. The system of claim 13, wherein the light hydrocarbons comprise one or more of condensate, distillates, naphtha, and combinations thereof.

18. The system of claim 13, wherein the recovery unit is configured to remove said light hydrocarbons from the process fluid for recycling to the process stream upstream of the recovery unit.

19. The system of claim 1, wherein the one or more process flow tubes each has an interior cross-sectional dimension in the form of an interior diameter, and the aggregated interior cross-section dimension comprises a sum of interior diameters of any process flow tubes configured to convey the process stream in parallel with one another.

20. The system of claim 1, wherein the outlet temperature T(max)1 is within a range of between about 260° C. to about 325° C.

21. The system of claim 1, wherein the reactor is configured to maintain the process stream at a pressure sufficient to substantially prevent formation of a gas phase separate from a liquid phase of the process stream therein.

22. The system of claim 21, wherein the reactor is configured to maintain the process stream at a pressure within a range of about 1500 to about 3000 psia.

23. The system of claim 22, wherein the reactor is configured to maintain the process stream at a pressure within a range of about 1500 to 2000 psia.

24. The system of claim 22, wherein the reactor is configured to maintain the process stream at a pressure within a range of about 2000 to 3000 psia.

25. The system of claim 1, wherein the residence time is calculated as the total volume of the fluid flow path within the reactor divided by the rate of flow therethrough.

26. The system of claim 1, wherein the controller is configured to selectively adjust a rate of heating of the process stream within the reactor.

27. The system of claim 1, comprising a premixer disposed in the fluid flow path upstream of the reactor, the premixer configured to maintain and supply the process stream to the reactor at said inlet temperature.

28. The system of claim 27, wherein the premixer is configured to maintain the process stream at a pressure sufficient to substantially prevent formation of a gas phase separate from a liquid phase of the process stream therein.

29. The system of claim 27, wherein the premixer is configured to add one or more materials to the process stream to form a substantially uniform dispersion.

30. The system of claim 1, wherein HCO in the process stream disaggregates to form a substantially uniform dispersion at a temperature in a range of about 80% to 90% of T(max)1 and one or more upstream reactor sub-portions are configured to heat the process stream to a predetermined maximum temperature of T(max)1, and one or more downstream reactor sub-portions are configured to heat the process stream to a second predetermined maximum temperature (T(max)2).

31. The system of claim 30, wherein the second predetermined maximum temperature T(max)2 is within a range of about 1.0 to 1.1 times T(max)1.

32. The system of claim 30, wherein the second predetermined maximum temperature T(max)2 is within a range of about 1.1 to 1.4 times T(max)1.

33. The system of claim 1, wherein the one or more flow-through chambers are configured to be heated so that the temperature of the process stream flowing from the outlet of each chamber is about the same as at the inlet thereto.

34. A method for upgrading a continuously flowing process stream including heavy crude oil (HCO), the method comprising supplying the process stream to the system of claim 1.

* * * * *